Oct. 28, 1947.  B. B. BACHMAN ET AL  2,429,789
SYNCHRONIZING CLUTCH MECHANISM
Filed May 27, 1944  5 Sheets-Sheet 1

INVENTOR.
BENJAMIN B. BACHMAN
BY DONALD J. MACKLIN
Attorney

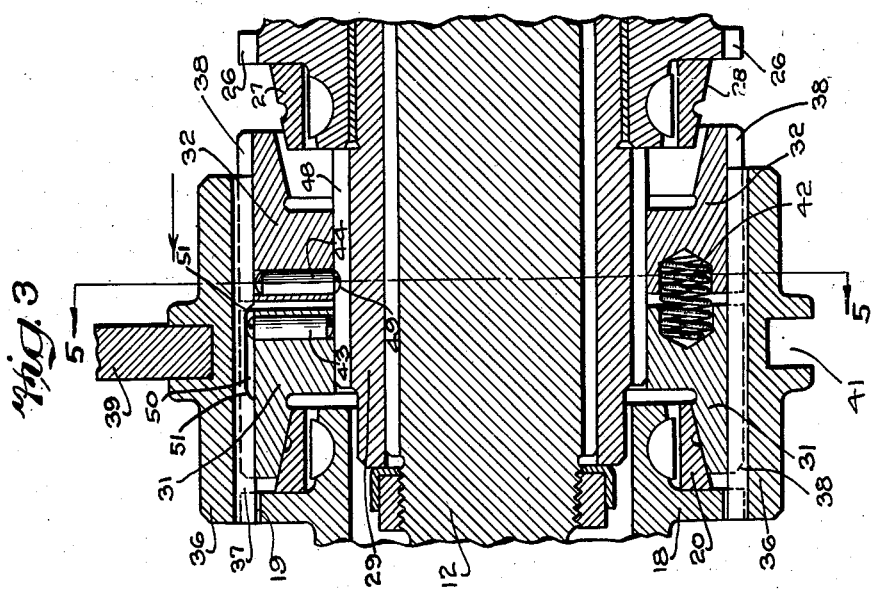
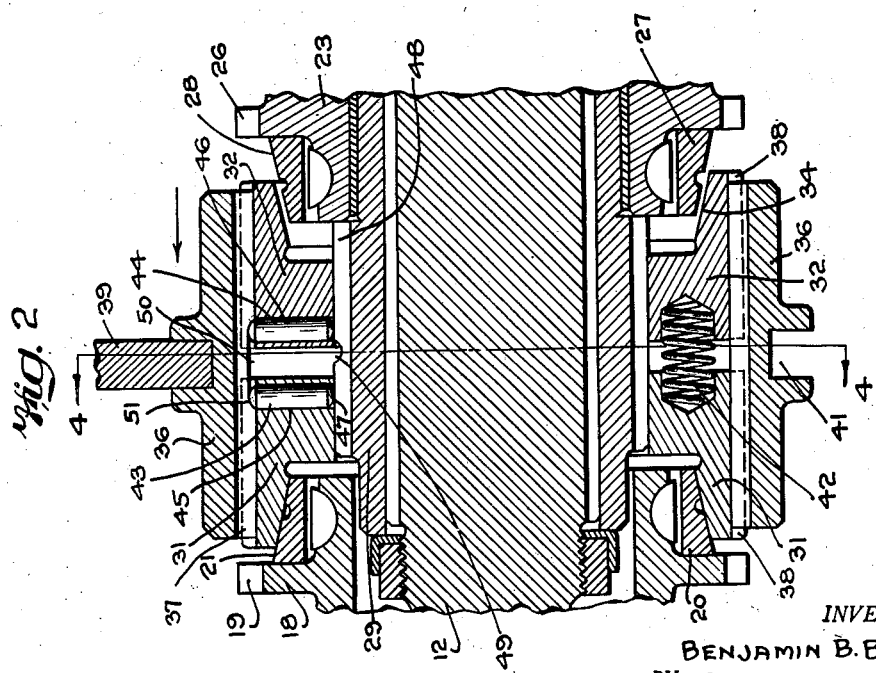

Oct. 28, 1947.  B. B. BACHMAN ET AL  2,429,789
SYNCHRONIZING CLUTCH MECHANISM
Filed May 27, 1944  5 Sheets-Sheet 3
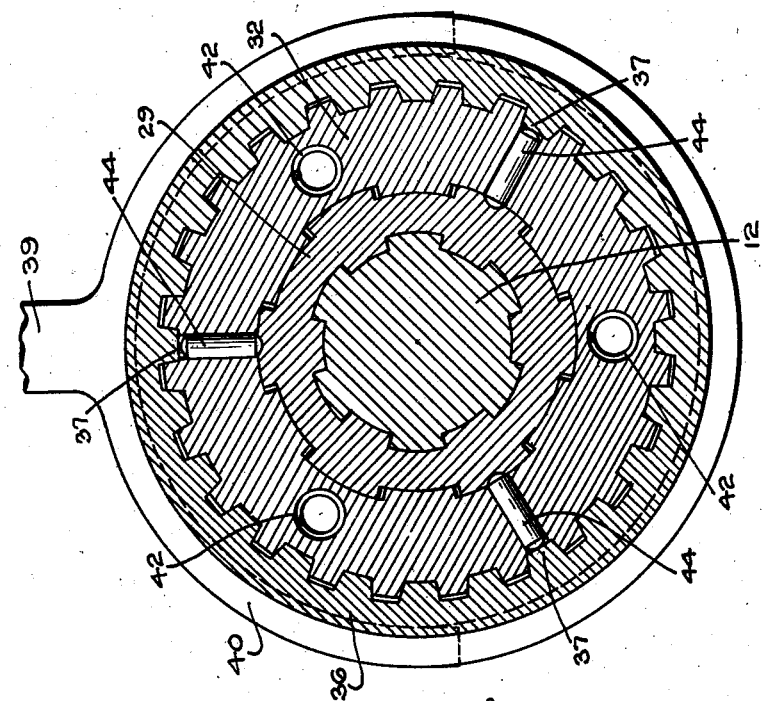
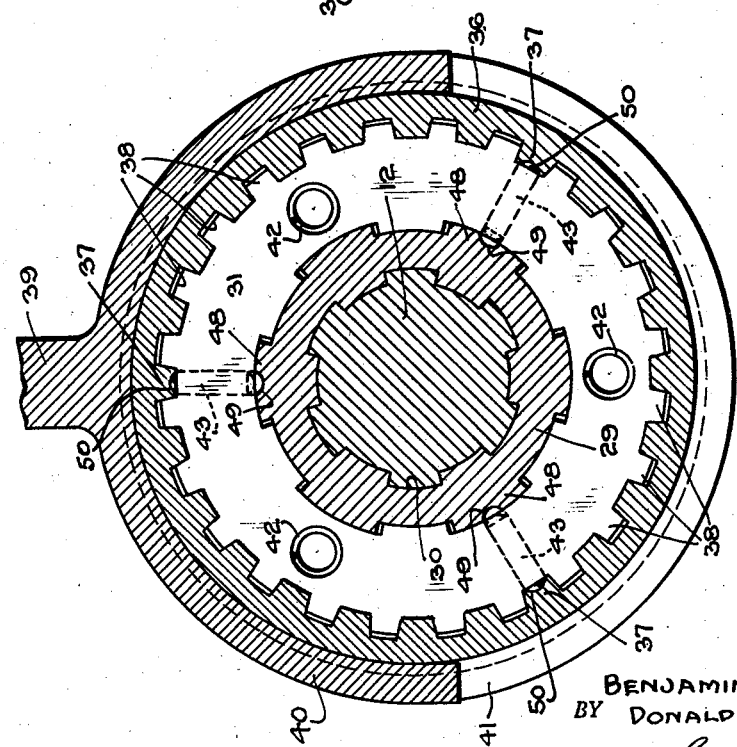
INVENTOR.
BENJAMIN B. BACHMAN
BY DONALD J. MACKLIN
Leon Edelson
Attorney

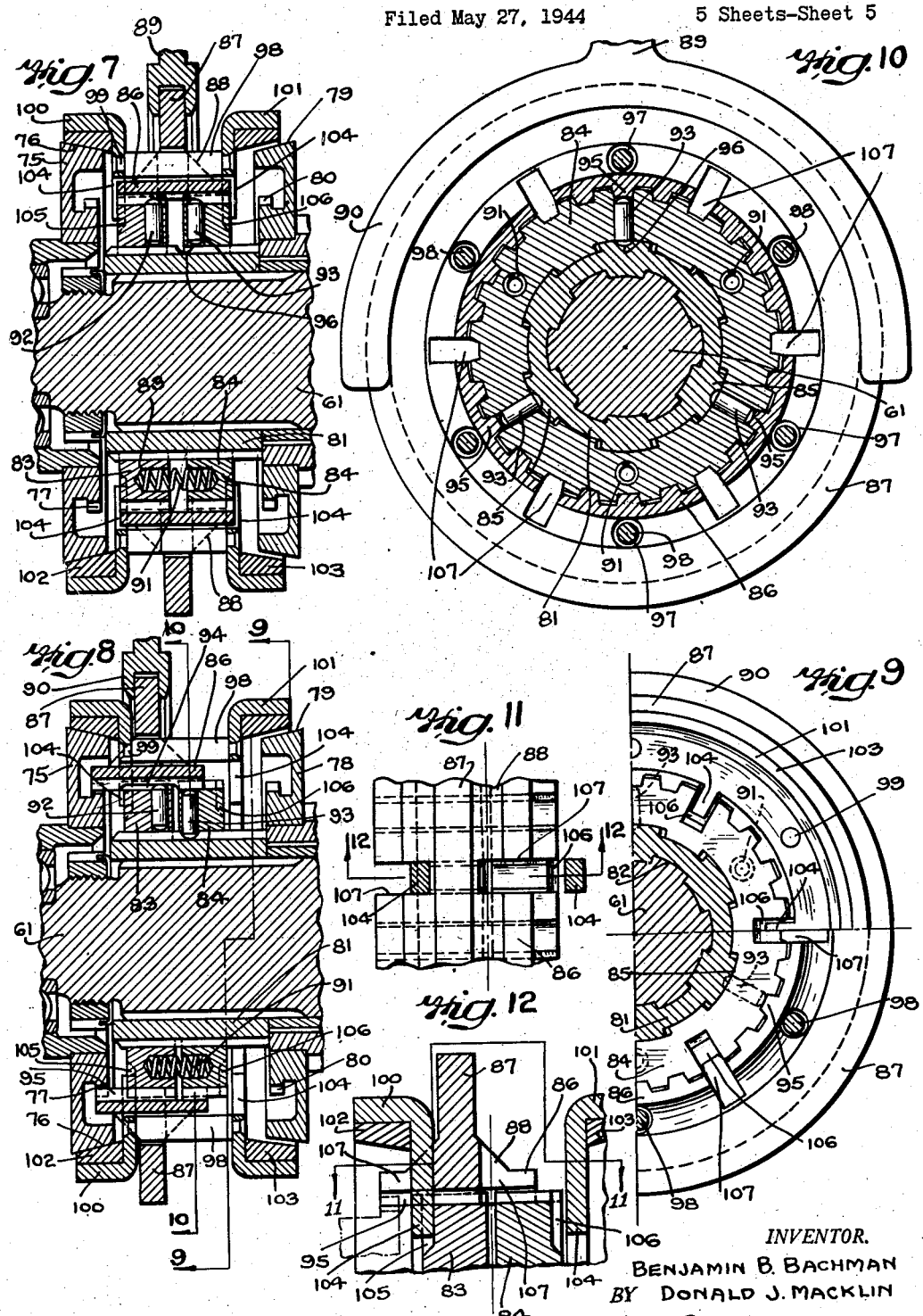

Patented Oct. 28, 1947

2,429,789

UNITED STATES PATENT OFFICE 2,429,789

SYNCHRONIZING CLUTCH MECHANISM

Benjamin B. Bachman, Philadelphia, and Donald J. Macklin, St. Davids, Pa., assignors to The Autocar Company, Ardmore, Pa., a corporation of Pennsylvania Application May 27, 1944, Serial No. 537,710

16 Claims. (Cl. 192—53)

This invention relates generally to change speed power transmission mechanisms and more particularly to an improved construction of synchronizing clutch mechanism associated with change-speed gearing especially adapted for motor vehicle power transmission mechanisms.

In its general aspect, the mechanism of the present invention includes coaxial, selectively actuated positive clutches combined with coaxial friction clutches which are operative to synchronize the speeds of those positive clutches which have been pre-selected for actuation and interengagement with each other, it being among the objects of the present invention to provide a new and improved means for effecting such synchronization of the positive clutch elements preliminarily to connecting them together in positive drive relation, the said means being operative to resist coupling of the positive clutch elements until synchronization has been effected by the friction clutch elements.

More specifically, it is an object of the present invention to provide in operative association with the axially shiftable set of positive and frictional clutch elements cam-actuated detents which serve the dual function of (a) coupling the axially movable gear shifting device to the friction clutch element which is to be shifted into preliminary engagement with its coaxial friction clutch element in opposition to relatively strong yielding resistance, and of (b) securely retaining in frictional engagement the operative set of coacting friction clutch elements not only during the operation of interengaging the corresponding set of coacting positive clutch elements, but also during all of the period that said positive clutch elements remain interengaged, thereby providing for practically effortless and noiseless engagement and disengagement of the latter elements.

Still other and important objects of the present invention are to simplify the design and construction of synchronizable variable speed-ratio geared transmissions and to provide for efficient and positive operation thereof.

It will be understood that the present invention consists substantially in the combination, construction, location and relative arrangement of parts, all as will be described more fully hereinafter, as shown in the accompanying drawings and as finally pointed out in the appended claims.

In the accompanying drawings, which for purposes of illustration show certain preferred embodiments of the present invention:

Figure 2 is a partial sectional view showing one set of frictional clutch elements engaged preliminarily to final engagement of the associated set of positive clutch elements;

Figure 3 is a view similar to Figure 2, but showing the positive elements finally engaged;

Figure 4 is a transverse sectional view taken on the line 4—4 of Figure 2;

Figure 5 is a transverse sectional view taken on the line 5—5 of Figure 3;

Figure 7 is a partial longitudinal sectional view of a portion of the transmission showing one set of friction clutch elements preliminarily engaged to synchronize the speed of the associated set of positive clutch elements;

Figure 8 is a view similar to Figure 7 showing the positive clutch elements in final engagement with each other;

Figure 9 is a transverse sectional view taken on the line 9—9 of Figure 8;

Figure 10 is a transverse sectional view taken on the line 10—10 of Figure 8;

Figure 11 is a plan or elevational view of a portion of the transmission viewed as indicated by the line 11—11 of Figure 12; and Figure 12 is a sectional view taken on the line 12—12 of Figure 11.

Figure 1:
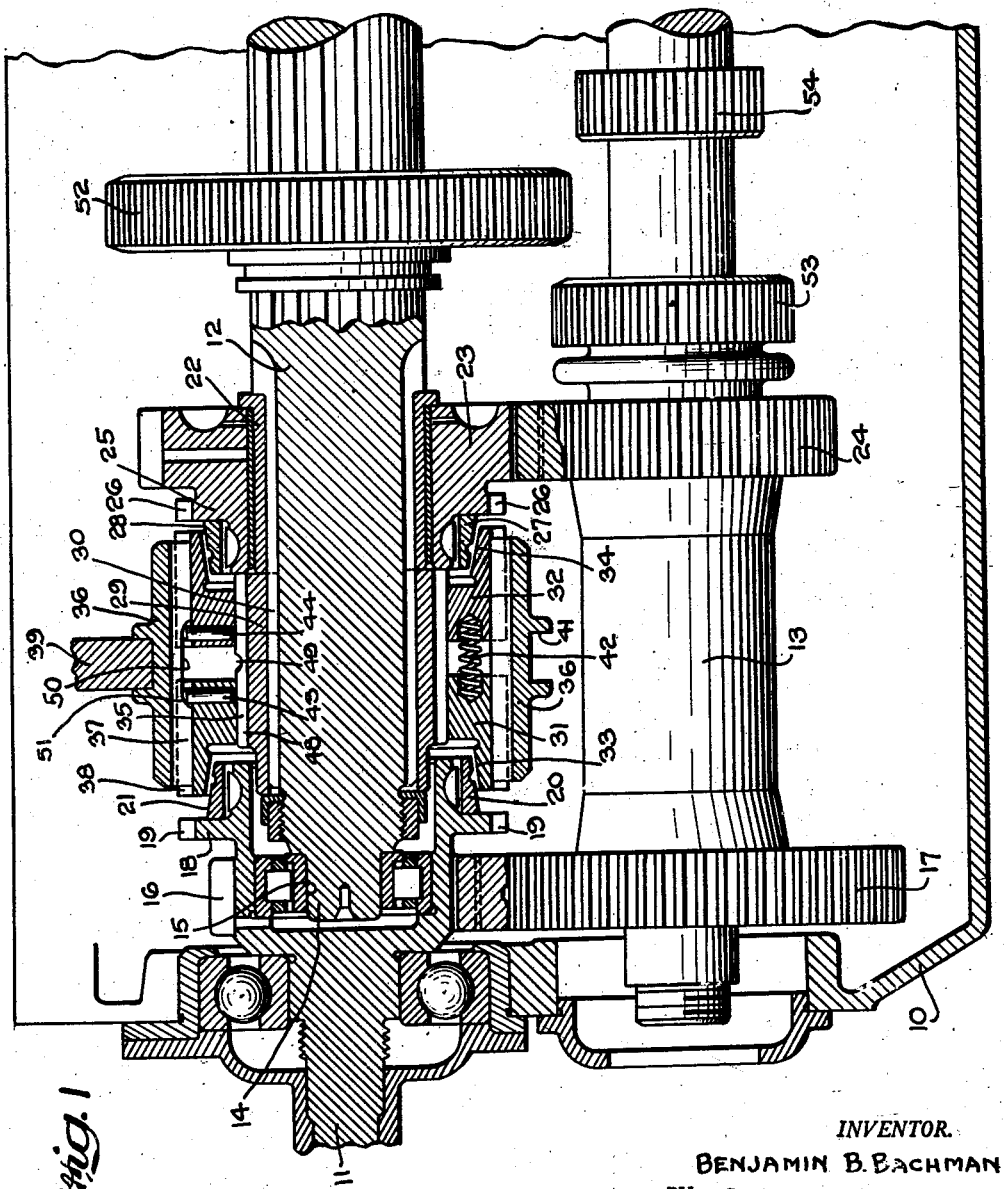
Figure 1 is a longitudinal section of a three speed motor vehicle transmission constructed in accordance with and embodying the principles of the present invention.

Referring now to the drawings and more particularly to Figures 1 to 5, inclusive, which illustrate the present invention as embodied in a motor vehicle transmission having three forward driving speeds, conventionally known as first, second and third speeds, it will be observed that said transmission, which is suitably enclosed within a gear box or housing 10, includes the usual power input shaft 11, supported for rotation within ball-bearings at the forward end of the housing, a main power output or spline shaft 12 arranged in axial alinement with the power input shaft and a countershaft 13 conventionally disposed to one side of and in parallel relation to the power output shaft 12. As most clearly appears in Figure 1, the power output shaft 12 is provided at its forward end with a reduced portion 14 which is piloted, in any suitable manner, within an internal bearing or bore 15 provided in the rear end of the power input shaft, the opposite or rear end of the power output shaft 12 being suitably journalled in ball-bearings (not shown).

Conventionally arranged upon the rear end of the power input shaft 11 is the usual driving gear 16 for the countershaft, this gear being in constant entrainment with the countershaft driven gear 17 by virtue of which the countershaft rotates upon rotation of the power input shaft 11. Also arranged upon the inner end of the shaft 11 in association with the countershaft driving gear 16 is a positive clutch element 18 in the form of a ring having a series of circumferentially spaced external gear-like clutch teeth 19, while immediately associated with this positive clutch element 18 and designed for rotation therewith is an annular friction clutch element 20 having an external conical friction clutch surface 21.

Suitably keyed or otherwise secured to the main shaft 12 for rotation therewith is a sleeve bearing 22 for a rotatable gear 23. This gear 23 which is adapted to rotate freely with reference to the main shaft 12 unless locked thereto by the means to be presently described, is in constant entrainment with the gear 24 which is fixed to and rotates with the countershaft 13. As clearly appears in Figure 1, the gear 23 is axially spaced rearwardly of the countershaft driving gear 16, the said gear 23 having associated therewith a positive clutch element 25 in the form of a ring having a series of circumferentially spaced, external gear-like clutch teeth 26, as well as with an annular friction clutch element 27 having an external conical friction clutch surface 28. It will be understood that the clutch teeth 26 correspond to the clutch teeth 19, while the clutch surface 28 corresponds to the previously described clutch surface 21. Also, it will be understood that the positive clutch teeth 19 and its associated friction clutch element 20 constitute part of the synchronizing coupling means to establish the transmission in high or third speed, while the positive clutch teeth 26 and its associated friction clutch element 27 constitute part of the synchronizing coupling means for establishing the transmission in intermediate or second speed ratio.

Operatively mounted upon the main shaft 12 in intervening relation between the axially spaced sets of positive and friction clutch elements heretofore described is a means for interlocking one or the other of these sets of elements to the main shaft 12. This means includes an inner supporting member 29 which is splined, as at 30, to the main shaft 12 for rotation therewith, the said supporting member 29 being retained by any suitable means against axial movement along the shaft 12. Fitted upon this supporting member 29 are a pair of friction clutch elements 31 and 32 which are respectively provided with internal friction clutch surfaces 33 and 34, the clutch surface 33 being shaped complementally with respect to and designed for coaction with the external clutch surface 21, while the internal clutch surface 34 is similarly shaped and designed for coaction with the external clutch surface 28.

The friction elements 31 and 32 are each splined, as at 35, for axial movements in opposite directions with respect to their supporting member 29, both of said friction elements 31 and 32 being rotatable with the main shaft 12. Commonly embracing the axially movable friction clutch elements 31 and 32 is an axially movable positive clutch member 36 having a series of internal gear-like clutch teeth 37, opposite ends of which are adapted respectively to engage one set or the other of the external positive clutch teeth 19 or 26. As clearly appears in the drawings, these internal clutch teeth 37 of the annular clutch member 36 interengage with corresponding gear-like elements 38 formed externally about the axially movable friction elements 31 and 32 and so effect a splined connection therebetween which permits of relative axial movement between the frictional clutch elements 31 and 32 and the positive clutch member 36, while at the same time insuring rotation of these parts commonly with the main shaft 12.

Operatively associated with the axially shiftable positive clutch member 36 is a shifting member 39 which is provided with a semicircular fork 40 (see Figures 4 and 5) which is received within an annular channel 41 formed externally about the member 36.

When the transmission is in neutral, as shown in Figure 1, the friction clutch elements 31 and 32 are respectively spaced from and centered between the friction clutch elements 20 and 27, while the positive clutch member 36 is centered upon the friction clutch elements 31 and 32. In this neutral condition of the parts, the friction clutch elements 31 and 32 are maintained in axially separated relation by means of a plurality of circumferentially spaced coiled compression springs 42 operating in conjunction with a plurality of circumferentially spaced sets of radially extending pins 43 and 44, these latter being disposed alternately with respect to the springs 42 about the axis of rotation of the shaft 12. The pins 43 extend through radial bores 45 suitably provided in the friction clutch element 31, while the pins 44 extend through similar bores 46 provided in the friction clutch element 32, it being noted that the opposite extremities of the pins 43 and 44 are each rounded, as at 47, to provide camming surfaces (see Figure 2).

As appears most clearly in Figures 2, 3 and 5, each set of the radial pins 43—44 is disposed in a radial plane which commonly includes one of the external splines 48 of the axially fixed member 29 and one of the internal splines or positive clutch teeth 37 of the axially movable clutch member 36, the opposite extremities of each set of the pins 43—44 being respectively in engagement with a spline 48 and a positive clutch tooth 37. Each of the splines 48, so engaged by the inner ends of the pins 43—44, is centrally notched or recessed, as at 49, to provide a detaining seat for the inner end of one or the other of the pins 43—44 when the member 36 is shifted to the limit of its movement in one direction or the other, while each of the clutch teeth 37, engageable by the outer ends of the pins 43—44, is centrally cut out to provide an elongated notch or recess 50 of a length sufficient to encompass each pair of pins 43 and 44 when spaced apart to their fullest extent as shown in Figures 1 and 2. The opposite ends of each of the elongated notches 50 are rounded off, as at 51, to provide in effect camming surfaces for a purpose to be presently described.

In addition to the foregoing, the transmission mechanism as constructed in accordance with the present invention includes a gear 52 suitably splined on the main shaft 12 for axial movement into and out of entrainment either with the gear 53 for low speed driving or with the usual reverse idler (not shown) driven by the gear 54 for reverse driving, the gears 53 and 54 being suitably arranged for rotation with the countershaft 13 and the gear 52 being shiftable on the main shaft 12 by any suitable means in accordance with conventional practice.

Having in mind the foregoing description, it will be noted that when the transmission is in neutral, as shown in Figure 1, the axially shiftable positive clutch member 36 is centered between the two sets of axially fixed positive clutch teeth 19 and 26, while at the same time the friction clutch members 31 and 32 are centered between and respectively spaced from their coacting frictional clutch elements 20 and 27. In this neutral condition of the mechanism, the friction clutch members 31 and 32 are resiliently pressed apart by the intervening coiled compression springs 42, the extent of axial separation of these members 31 and 32 being limited by means of the pins 43 and 44 in coaction with each of the elongated notches 50 formed in circumferentially spaced internal splines or teeth 37 of the central axially shiftable positive clutch member 36.

In order to establish the transmission in direct or third speed gear ratio, which, of course, involves coupling the power input shaft 11 directly to the main power output shaft 12, the positive clutch member 36 is shifted to the left, as indicated by the arrow in Figure 2, to preliminarily engage the internal friction surface 33 with its coacting external friction surface 21. In order to effect this operative interengagement of these coacting friction surfaces, the friction member 31 is axially shifted to the left by the member 36 through the intervention of the coiled compression springs 42, it being apparent that as said member 36 is axially shifted to the left, the right hand end 51 of the notch 50 engages the outwardly projecting end of the pin 44 and so draws the member 32 to the left, this movement of said member 32 being transmitted in turn to the member 31 by means of the intervening coil springs 42. In consequence, the friction clutch member 31 engages the friction clutch element 20 to synchronize the speeds of rotation of the shafts 11 and 12, further movement of the positive clutch member 36 to the left resulting in interengagement of its internal positive clutch teeth 37 with the external positive clutch teeth 19 which are associated and rotate with the power input shaft 12.

As the positive clutch member 36 is shifted to the left for establishing the high or third speed ratio as just described, the pin 44 is brought into registry with the notch 49, as shown in Figure 3, in which relative position of the parts the lower end of said pin becomes seated in said notch, while the outer end thereof rides out of the elongated notch 50 to be engaged by the flat inner surface of the notch spline or positive clutch tooth 37. The pin 44 is thus detained or locked in its position shown in Figure 3 so long as the coacting positive clutch elements are maintained in engagement, at the same time that the springs 42 are compressed as shown to exert an axial pressure against the friction clutch element 31 sufficient to keep it in operative frictional engagement with its coacting friction clutch element 20.

From the foregoing it will be apparent that preliminary shifting of the member 36 to the left from its neutral position shown in Figure 1 results initially in interengagement of the coacting friction clutch elements 20 and 31, as shown in Figure 3, to synchronize the rotating speeds of the coacting positive clutch teeth 19 and 37 to permit their subsequent positive interengagement. Upon further and continued shifting of the member 36 with sufficient effort to overcome the resisting force exerted by the compression springs 42, the member 32 is shifted axially toward the member 31, which is now axially fixed in position by its engagement with the friction element 20, with the result that the pins 44 are all inwardly depressed, as shown in Figure 3, to also lock the member 32 in axially fixed position. With the pins 44 depressed and in engagement with their inner detaining seats 49, the member 36 is then free to be shifted to the limit of its permissible movement to the left to effect the final interengagement of the coacting positive clutch teeth 19 and 37 upon attainment of synchronization in their speeds.

Inasmuch as the member 36 is coupled to the shaft 12 for rotation therewith through the intervention of the friction clutch members 31 and 32, it will be apparent that upon interengagement of the positive clutch teeth 19 and 37, as just described, the shaft 11 becomes directly coupled to the shaft 12 to establish the transmission in direct or high speed ratio.

In order to establish the transmission in intermediate or second speed ratio, the member 36 is shifted to the right, i. e. oppositely to the direction indicated in Figures 2 and 3, with the result that the friction clutch elements 27 and 32 are initially engaged to synchronize the speed of the shaft 12 with that of the gear 23 preliminarily to effecting interengagement of the positive clutch teeth 26 associated with the gear 23 and the positive clutch teeth 37 of the axially shiftable member 36. The procedure is in all respects the same as that previously described for establishing the transmission in high speed except for the reversal in function and operation of pins 43 and 44 and their immediately associated parts, it being observed that when said coacting positive clutch teeth 26 and 37 have been interengaged, the shaft 12 is coupled to the input power shaft 11 through the intervention of the countershaft 13 and the gears 16, 17, 23 and 24.

Figure 6:
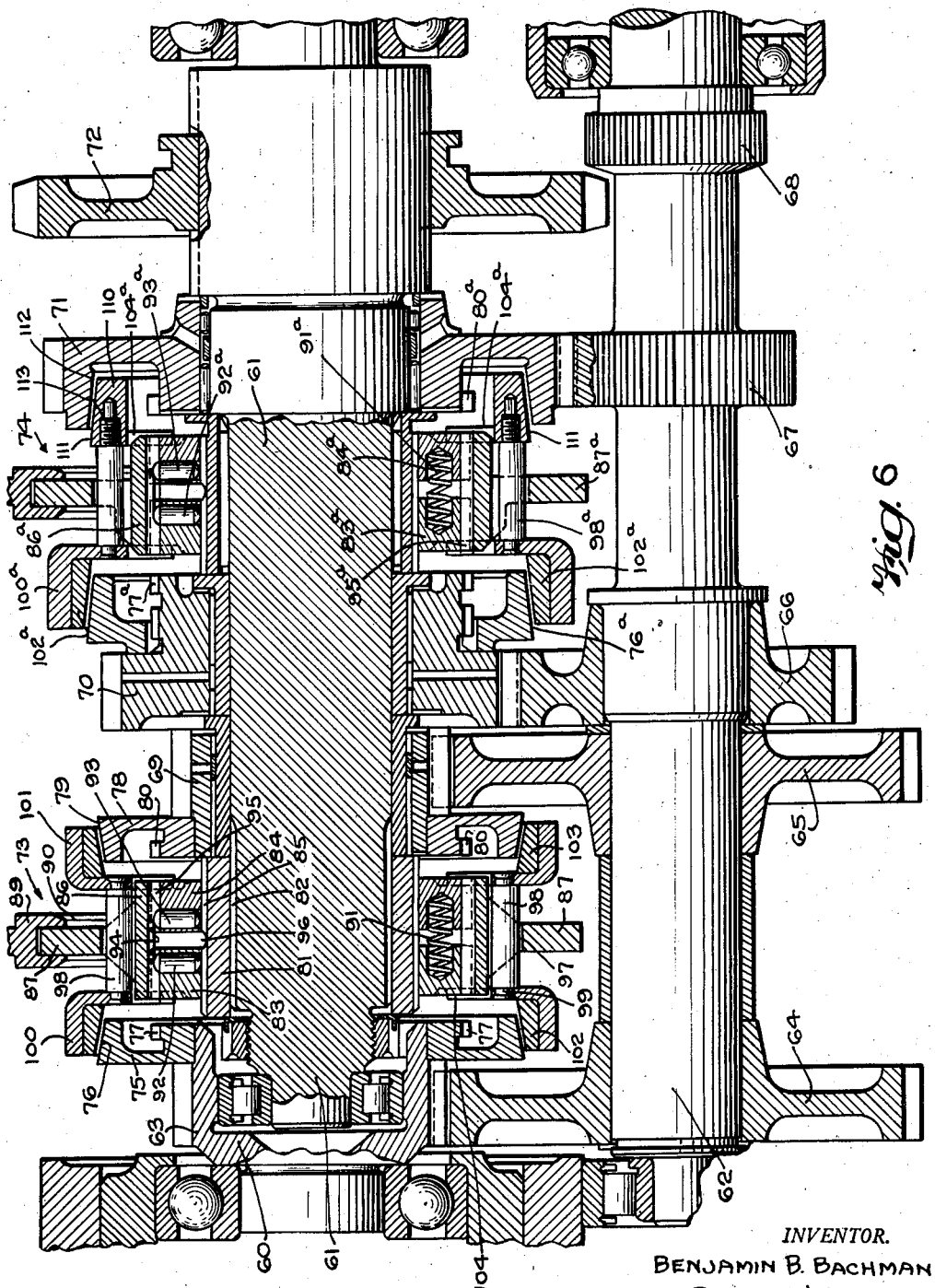
Figure 6 is a longitudinal sectional view of a five speed vehicle transmission constructed in accordance with the present invention.

The synchronizing clutch mechanism of the present invention is applicable not only to the conventional three-speed transmission, as hereinbefore described, but also to a five-speed transmission of the type having an overdrive or fifth speed gear ratio. A transmission mechanism of the latter type constructed in accordance with and embodying the principles of the present invention is shown in Figures 6 to 12, inclusive. Referring first to Figure 6, it will be observed that this mechanism is provided with the conventional power input shaft 60, power output shaft 61 and the countershaft 62. This latter shaft is driven from the shaft 60 through the intervention of the constantly entrained gears 63 and 64 respectively secured to and rotatable with the shafts 60 and 62. In addition, the countershaft 62 has secured thereto, a fifth speed gear 65, a third speed gear 66, a second speed gear 67, a first speed gear 68 and the usual gear (not shown) which meshes with the reverse idler for reverse driving. The countershaft gears 65, 66 and 67 are respectively in constant mesh with the gears 69, 70 and 71 suitably journalled upon the main driven shaft 61 for rotation thereabout; while a gear 72, suitably splined to the shaft 61 to provide for axial shifting of the gear along the shaft while fixed for rotation therewith, is employed for selective entrainment with either the first speed gear 68 or the reverse idler driving gear (not shown) for establishing the transmission in either first speed or reverse. All of the parts of the transmission of Figure 6 so far described are of more or less conventional construction and arrangement and form no part of the present invention except insofar as they may be operatively associated with the synchronizing clutch mechanisms now to be described.

As appears most clearly in Figure 6, the direct drive or fourth speed gear 63 and the overdrive or fifth speed gear 69, both of which are rotative relatively with respect to the main driven shaft 61 and accordingly require their speeds to be synchronized with the speed of the shaft 61 before the latter is positively coupled to one or the other of said gears, are disposed to opposite sides of a synchronizing clutch unit designated generally by the reference numeral 73. Similarly, the third speed gear 70 and the second speed gear 71, also rotatable relatively with respect to the shaft 61 and so requiring synchronization therewith preliminarily to effecting positive coupling of said shaft with one or the other of said gears 70 and 71, are disposed to either side of a second synchronizing clutch unit designated generally by the reference numeral 74. Inasmuch as these speed synchronizing units 73 and 74 are substantially alike in construction and operation, only one of them will be described in detail, this being the first unit 73, the mechanical construction of which is further shown in Figures 7 to 12, inclusive.

As most clearly appears in Figures 6, 7 and 8, the fourth speed or direct drive gear 63 is suitably fitted at its inner end with an annular member 75 having an external conical friction clutch surface 76 and an internal ring of positive gear-like clutch teeth 77, the friction clutch surface 76 and the internal ring of clutch teeth 77 being coaxial with each other and rotatable together with the countershaft drive gear 63.

Similarly associated with the fifth speed gear 69 for rotation therewith is the annular member 78 having an external conical friction surface 79 and an internal ring of positive gear-like clutch teeth 80, this member 78 being axially spaced from its corresponding member 75 a distance sufficient to accommodate therebetween the synchronizing clutch unit 73.

This synchronizing clutch unit 73 generally consists of an annular supporting member 81 which is splined or otherwise suitably keyed, as at 82, to the shaft 61 for rotation therewith, in combination with axially shiftable friction and positive clutch elements which are respectively engageable with the friction clutch surface and the positive clutch teeth associated with one or the other of the gears 63 and 69. As in the arrangement shown in Figures 1 to 5 and previously described, the synchronizing clutch mechanism 73 includes a pair of axially shiftable members 83 and 84, these members being commonly splined, as at 85, to the internal supporting annulus 81 and being thereby rotatable with the shaft 61. The outer rims of these axially shiftable members 83 and 84 are in turn commonly embraced by and splined to an axially shiftable positive clutch member 86, which in turn is provided with a centrally disposed, radially extending circumferential flange 87, this flange being preferably integrally secured to the annular positive clutch member 86 and reinforced by circumferentially extending fillets 88—88 (see more particularly Figure 12). A shifting member 89 having a semi-circular yoke 90 of channel cross-section operatively engages the radial flange 87 of the synchronizing clutch mechanism and is operative to shift the latter in one direction or the other axially of the shaft 61 while permitting said mechanism to rotate freely about the axis of said shaft.

As in the arrangement previously described, the axially shiftable members 83 and 84 are normally maintained in axially separated relation by means of a plurality of circumferentially spaced coiled compression springs 91 which operate in conjunction with a plurality of circumferentially spaced sets of radially extending pins 92 and 93, these latter being disposed alternately with respect to the springs 91 about the axis of rotation of the shaft 61. The pins 92 and 93 respectively extend through radial bores suitably provided in the members 83 and 84, the outer rounded ends of each pair of these pins being normally seated within the opposite ends of an elongated notch or recess 94 centrally formed in certain of the circumferentially spaced splines or internal positive clutch teeth 95 of the member 86. It will be understood, of course, that these internal splines or positive clutch teeth of the member 86 correspond in number and spacing with the positive clutch teeth 77 and 80 respectively associated with the gears 63 and 69, the internal teeth of the member 86 being selectively engageable with either the clutch teeth 77 or the clutch teeth 80. The inner ends of each circumferentially spaced pair of pins 92 and 93 normally engage circumferentially spaced external splines formed on the inner supporting member 81, the splines so engaged by the inner ends of each pair of pins being respectively in radial alinement with the internal splines or positive clutch teeth of the member 86 with which the outer ends of each of said pair of pins is in engagement. Each of the external splines of the member 81 which are engaged by a pair of the pins 92 and 93 is centrally provided with a notch or recess 96 which serves as a detaining seat for the inner end of one or the other of each pair of said pins when the number 86 is shifted to the limit of its movement in one direction or the other.

Extending transversely through each of a plurality of circumferentially spaced apertures 97 formed in the radially extending outer flange 87 is a bar or rod 98. As most clearly appears in Figure 10, six of such transverse bars or rods 98 are employed, although any other suitable number may be used, the opposite ends of these rods being commonly riveted or otherwise secured, as at 99, respectively to a pair of annular drum or cupped friction clutch members 100 and 101. These latter members are respectively fitted with internally coned annular friction elements 102 and 103 which are adapted respectively to engage the external conical friction surfaces 76 and 79 heretofore described and respectively associated with the gears 63 and 69. The transversely extending rods 98 together with the pair of cupped friction clutch elements 100 and 101 carried thereby constitute a unitary assembly which is adapted to be axially shifted in one direction or the other to engage one or the other of the rotating friction surfaces 76 and 79 preliminarily to effecting interengagement of the internal positive clutch teeth 95 of the member 86 with one set or the other of the external positive clutch teeth 77 and 80.

Accordingly, it will be apparent that the friction clutch assembly consisting of the rods 98 and the members 100 and 101 carried thereby necessarily require to be axially shiftable with respect to the central positive clutch member 86. Also, some means must be provided to effect axial shifting of the members 100 and 101 in one direction or the other through the intervention of the shifting member 89 operatively associated with the circumferential flange 87 on the member 86 preliminarily to effecting a corresponding shift of the latter member. In order to accomplish these required objectives, the cupped friction clutch elements 100 and 101 are respectively provided with circumferentially spaced fingers 104 which extend radially inwardly toward the axis of rotation of the mechanism. The circumferentially spaced fingers 104 of the friction member 100 are respectively accommodated within suitable recesses or notches 105 (see more particularly Figures 11 and 12) formed in the side of the member 83 facing the gear 63 and its associated member 75, while the corresponding fingers 104 of the member 101 are respectively accommodated within circumferentially spaced notches or recesses 106 formed in that side of the member 84 which faces the gear 69 and its associated member 78. Also, as most clearly appears in Figures 9, 10, 11 and 12, the member 86 is provided in each end thereof with a plurality of circumferentially spaced notches 107 which correspond in number and spacing with the fingers 104 on the members 100 and 101. These notches 107 extend inwardly from opposite ends of the member 86 to a distance sufficient to permit the latter member to be shifted axially of the fingers 104 to effect its engagement with one set or the other of the positive clutch teeth 77 and 80. Thus, as clearly appears in Figures 11 and 12, these axially extending slots in the member 86 extend through the annular reenforcing fillets 88 to terminate just short of either side of the opposite plane surfaces of the annular flange 87.

Having in mind the foregoing, it will be apparent that when the transmission is in neutral, as shown in Figure 6, the pair of internal friction elements 102 and 103 fitted in the cup-shaped members carried upon opposite ends of the transversely extending rods 98 will be centered between and respectively spaced from the external friction surfaces 76 and 79. At the same time, the positive clutch member 86 is centered between and in spaced relation with respect to the positive clutch teeth 77 and 80, while the fingers 104 of the members 100 and 101 are respectively accommodated within the notches 105 and 106 formed in the members 83 and 84. Also, in this neutral condition of the parts, the radially extending pins 92 and 93 are disposed to either side of the recesses 96 centrally formed in the splines 85, while the outer rounded ends of these pins 92 and 93 are respectively in engagement with the opposite extremities of the elongated notches 94 formed in the internal positive clutch teeth 95 of the axially shiftable positive clutch member 86.

When it is desired to establish the transmission in direct drive, that is, fourth speed gear ratio, in which condition the shafts 63 and 61 are directly coupled together, the member 86 is axially shifted to the left by means of the shifting member 89 in engagement with the annular flange 87 carried by and rotatable with the member 86. As this member 86 is so shifted to the left, it carries with it the member 84 through the coupling connection afforded by the pin 93, the member 84, in turn, urging the member 83 axially to the left through the intervention of the coiled compression springs 91. As the member 83 is thus axially shifted to the left, through the engagement therewith of the fingers 104 of the cupped friction clutch element 100, the coned friction element 102 is caused to frictionally engage the annular friction surface 76 of the member 75 which, together with the gear 63, is rotatable freely with respect to the shaft 61. Upon engagement of these coacting friction surfaces, the rotating speed of the member 75 is synchronized with that of the shaft 61 due to the fact that the member 100 is so keyed to the member 83 and through it to the shaft 61 as to be rotatable with the latter.

Having so effected synchronization in speed between the power input and power output shafts, in which condition the several parts of the mechanism assume the relative positions shown in Figure 7, further axial shifting of the coupling member 86 to the left, as shown in Figure 8, results in interengagement of the internal positive clutch teeth 95 of said member 86 with the coacting set of positive clutch teeth 77 formed on the member 75. In connection with this further axial shifting to the left of the member 86, it will be observed that such shifting is relative with respect to the outer annular drum 100 and the inner member 83, both of the latter having been immobilized against axial shifting upon interengagement of the coacting frictional clutch elements. In the final positive-clutched condition of the parts, as shown in Figure 8, the pin 93 will have been depressed into their inner detaining seats 96 to be held fixed therein by engagement of the free surfaces of the splines or clutch teeth 95 against the outer ends of said pins 93, exactly as in the case of the mechanism previously described and shown in Figures 1 to 5, the coiled springs 91 being then compressed to exert an axial pressure against the friction clutch element 102 sufficient to keep it in operative frictional engagement with its coacting friction surface 76.

In order to establish the transmission in overdrive or fifth speed gear ratio, the member 87 is shifted to the right, with the result that the friction clutch elements 103 and 79 are initially engaged to synchronize the speed of the shaft 61 with that of the gear 69 preliminarily to effecting interengagement of the positive clutch teeth 80 associated with the gear 69 and the positive clutch teeth 95 of the axially shiftable member 86. The procedure is in all respects the same as that just described for establishing the transmission in direct drive, except for the reversal in functions and operation of the pins 92 and 93 and their immediately associated parts, it being noted that when said coacting positive clutch teeth 80 and 95 have been interengaged, the shaft 61 is then coupled to the input power shaft 63 through the intervention of the countershaft 62 and the gears 63, 64, 65 and 69.

In order to establish the transmission mechanism shown in Figure 6 in either third or second speed, the second synchronizing clutch unit 74 is employed. Except for some minor changes in construction, this unit is structurally and functionally the same as the synchronizing clutch unit 73 hereinbefore described in detail. As appears in Figure 6, the second speed friction clutch element of the unit 74 is shown to be in the form of an annular member 110 having an external conical friction surface 111, which is adapted to engage an internal conical friction surface 112 formed as an adjunct to the second speed gear 71. In all other respects, the construction of the unit 74 is substantially the same as that of the unit 73 and therefore, the corresponding parts thereof have been designated by similar reference numerals with the distinguishing exponent $a$ added thereto, the pins being designated by the reference numerals 92$^a$ and 93$^a$ to indicate their correspondence with the pins 92 and 93 of the unit 73. It will be understood, of course, that the construction of the friction and positive clutch elements per se may be varied as desired without departing from the principles of the present invention. Where it is desired to provide the synchronizing clutch unit with a friction clutch element which is adapted to internally engage a friction clutch surface, as exemplified by the friction clutch ring 110 of Figure 6, the transverse bars or rods 98$^a$ are preferably threaded into the ring, as at 113.

It will be apparent, of course, that in order to establish the transmission in third speed gear ratio, the speed synchronizing unit 74 is actuated to preliminarily engage the friction clutch element 102$^a$ with the friction clutch surface 76$^a$ to thereby synchronize the speed of the shaft 61 with that of the gear 70, following which the clutch teeth 95$^a$ of the member 86$^a$ are engaged with the clutch teeth 77$^a$ associated with the gear 70 to thereby positively couple the shaft 61 to the power input shaft through the intervention of the power shaft 62 and the gears 63, 64, 66 and 70. Similarly, in order to establish the transmission mechanism in second speed, the speed synchronizing unit 74 is actuated, in the manner described, to preliminarily engage the friction surfaces 113 and 112 to thereby synchronize the speeds of the shaft 61 and the gear 71, following which the positive clutch member 86$^a$ is positively clutched to the clutch teeth 80$^a$ associated with the gear 71, the shaft 61 being then coupled to the input power shaft through the intervention of the countershaft 62 and the gears 63, 64, 67 and 71.

It will be noted that in the arrangement illustrated in Figures 1 to 5, inclusive, the positive clutch elements are arranged externally of the friction clutch elements, while in the arrangement of Figures 6 to 12, inclusive, the positive clutch elements are arranged internally of the friction clutch elements. Both arrangements have certain advantages which will be obvious to those skilled in the art. Thus, in the first arrangement, axially shiftable friction clutch elements are formed as integral axially extending adjuncts of the shiftable inner members 31 and 32. While this arrangement is of the simplest design in that it eliminates the need of providing separate friction cup members secured together and carried by transverse rods, as in the second arrangement, it possibly increases somewhat the overall length of the speed synchronizing unit. Where compactness in design of the transmission mechanism as a whole is a desideratum, the second arrangement as illustrated in Figures 6 to 12, inclusive, may possibly be employed to best advantage, because in such arrangement, the overall dimension of the synchronizing unit is reduced, thereby rendering it particularly adaptable to five-speed transmission mechanisms, as illustrated. However, inasmuch as both arrangements are basically alike in construction and operation, either one may be employed in a three or five speed vehicle transmission mechanism.

While several modifications of the present invention have been illustrated and described, it will be understood that the general principles of the present invention are not at all limited thereto but instead may be embodied in still other arrangements without involving any departure from such principles, and accordingly, it will be understood further that it is intended to claim the invention broadly, as well as specifically, as indicated by the appended claims.

What is claimed as new and useful is:

1. In a variable speed transmission mechanism having a pair of coaxial power transmitting members, each of which is equipped with operatively associated friction and positive clutch elements, the clutch elements of one member being fixed and those of the other member being axially shiftable, means for effecting relative movement of the axially shiftable clutch elements to provide for interengagement of the friction clutch elements preliminarily to engagement of their operatively associated positive clutch elements, said means including a pair of coaxial inner members splined to one of said power transmitting members for rotation therewith and limited axial movement relatively thereto, spring means interposed between said coaxial inner members for normally maintaining the same in axially spaced relation and for transmitting axial movement by one to the other thereof, an annular shifting member externally splined to said coaxial inner members for axial shifting movement relatively thereto while rotatable therewith, and means interposed between said external annular member and said coaxial inner members for selectively coupling said annular member to one or the other of said coaxial inner members, depending upon the direction of shift of said annular member, whereby the coupled coaxial inner member is rendered operative to effect axial movement of the other coaxial inner member through the intervention of said spring means.

2. In a variable speed transmission mechanism having a pair of coaxial power transmitting members, each of which is equipped with operatively associated friction and positive clutch elements, the clutch elements of one member being fixed and those of the other member being axially shiftable, means for effecting relative movement of the axially shiftable clutch elements to provide for interengagement of the friction clutch elements preliminarily to engagement of their operatively associated positive clutch elements, said means including an external axially shiftable annular member concentric with respect to and rotatable with one of said power transmitting members, a pair of axially shiftable members disposed internally of said annular member for rotation therewith, said internal members being axially relatively movable, spring means interposed between said internal members for resiliently biasing the same apart, and radially extending pins respectively associated with each of said internal members for selectively coupling one or the other of the latter to the said external annular shifting member depending upon the direction of axial shift thereof whereby to transmit said axial shift directly to the coupled internal member and indirectly to the other of said internal members through the intervention of said spring means.

3. In a variable speed transmission mechanism having a pair of coaxial power transmitting members, each of which is equipped with operatively associated friction and positive clutch elements, the clutch elements of one member being fixed and those of the other member being axially shiftable, means for effecting relative movement of the axially shiftable clutch elements to provide for interengagement of the friction clutch elements preliminarily to engagement of their operatively associated positive clutch elements, said means including an external axially shiftable annular member concentric with respect to and rotatable with one of said power transmitting members, a pair of axially shiftable members disposed internally of said annular member for rotation therewith, said internal members being axially relatively movable, spring means interposed between said internal members for resiliently biasing the same apart, radially extending pins respectively associated with each of said internal members for selectively coupling one or the other of the latter to the said external annular shifting member depending upon the direction of axial shift thereof whereby to transmit said axial shift directly to the coupled internal member and indirectly to the other of said internal members through the intervention of said spring means, said radially extending pins being movable with respect to their associated members, and means providing for limited radial movement of those pins immediately associated with the internal member which is directly coupled to the external shifting member to disconnect said pins from the latter and thereby permit it to be axially shifted relatively to said internal members.

4. In a variable speed transmission mechanism having a pair of coaxial power transmitting members, each of which is equipped with operatively associated friction and positive clutch elements, the clutch elements of one member being fixed and those of the other member being axially shiftable, means for effecting relative movement of the axially shiftable clutch elements to provide for interengagement of the friction clutch elements preliminarily to engagement of their operatively associated positive clutch elements, said means including an external axially shiftable member arranged concentrically with respect to and for rotation with one of said power transmitting members, a pair of axially shiftable members disposed internally of said externally axially shiftable member for rotation therewith, said internal members being commonly splined to said last-mentioned power transmitting member and said external shiftable member for axial movement relatively to each other, and coupling means interposed between said external and internal members and operative to initially provide for limited axial shifting of said internal members commonly with said external member and thereafter provide for continued axial shifting of said external member relatively to said internal members.

5. In a variable speed transmission mechanism having a pair of coaxial power transmitting members, each of which is equipped with operatively associated friction and positive clutch elements, the clutch elements of one member being fixed and those of the other member being axially shiftable, means for effecting relative movement of the axially shiftable clutch elements to provide for interengagement of the friction clutch elements preliminarily to engagement of their operatively associated positive clutch elements, said means including an external axially shiftable member arranged concentrically with respect to and for rotation with one of said power transmitting members, a pair of axially shiftable members disposed internally of said external axially shiftable member for rotation therewith, said internal members being commonly splined to said last-mentioned power transmitting member and said external shiftable member for axial movement relatively to each other, coupling means interposed between said external and internal members and operative to initially provide for limited axial shifting of said internal members commonly with said external member and thereafter provide for continued axial shifting of said external member relatively to said internal members, and spring means interposed between said pair of axially shiftable internal members for transmitting axial movement of one of said members to the other and for resiliently maintaining in axially fixed position the internal member which is axially shifted through the intervention of said spring means.

6. In a variable speed transmission mechanism as defined in claim 4 wherein said coupling means includes radially extending pins slidably carried by each of said axially shiftable internal members, a pin of one member being so disposed and related with respect to a corresponding pin of the other member that the outer ends thereof normally seat in an elongated notch formed centrally in and extending longitudinally along the internal surface of the external axially shiftable member, the inner ends of the said pins being selectively adapted for reception in a detaining seat radially alined with said notch and formed in the said power transmitting member to which said axially shiftable internal members are splined.

7. In a variable speed transmission mechanism as defined in claim 4 wherein said coupling means includes radially extending pins slidably carried by each of said axially shiftable internal members, a pin of one member being so disposed and related with respect to a corresponding pin of the other member that the outer ends thereof normally seat in an elongated notch formed centrally in and extending longitudinally along the internal surface of the external axially shiftable member, the inner ends of the said pins being selectively adapted for reception in a detaining seat radially alined with said notch and formed in the said power transmitting member to which said axially shiftable internal members are splined, said pins being thereby selectively operative, depending upon the direction of shift of the external member, to initially couple one or the other of said internal members directly to the external member for common axial shifting thereof and thereafter lock said shifted internal member in axially fixed position while permitting continued shifting of the external member relatively thereto.

8. In a variable speed transmission mechanism as defined in claim 4 wherein means is provided for rendering said coupling means initially operative to couple one or the other of said internal members to the external axially shiftable member depending upon the direction of shift of the latter and thereafter operative to lock the shifted internal member in axially fixed position while permitting continued shifting of the external member relatively thereto.

9. In a variable speed transmission, a speed synchronizing mechanism comprising a pair of axially spaced sets of clutch elements, each set being axially fixed and including a positive clutch element and an associated friction clutch element, a plurality of axially shiftable concentric members disposed intermediate said spaced sets of axially fixed clutch elements, the outer of said concentric members being in the form of a cylindrical body internally toothed for engagement with one or the other of said spaced axially fixed positive clutch elements and the inner of said concentric members including a pair of axially spaced elements each having operatively associated therewith friction clutch elements respectively adapted for interengagement with one or the other of said spaced axially fixed friction clutch elements said axially spaced elements of the inner concentric member being relatively movable and respectively provided with means operative to couple said concentric members together for preliminary common axial movement thereof and subsequent relative axial movement therebetween, and means providing for relative axial shifting of the said concentric members whereby to effect frictional interengagement of an axially shiftable friction clutch element with an axially fixed friction clutch element preliminarily to positive engagement of the internally toothed cylindrical body with the axially fixed positive clutch element immediately associated with the frictionally engaged clutch element aforesaid.

10. In a variable speed transmission as defined in claim 9 wherein said axially spaced elements of the inner concentric member are provided with intervening yieldable means for normally maintaining the same in axially spaced relation, and wherein said coupling means between the concentric members operates to initially couple one or the other of said inner elements directly to the outer cylindrical member for limited common axial shifting thereof and thereafter lock said shifted inner element in axially fixed position while permitting continued shifting of the outer cylindrical member relatively thereto.

11. In a variable speed transmission as defined in claim 9 wherein said axially spaced elements of the inner concentric member are provided with intervening yieldable means for normally maintaining the same in axially spaced relation, and wherein said coupling means between the concentric members operates to initially couple one or the other of said inner elements directly to the outer cylindrical member for limited common axial shifting thereof and thereafter lock said shifted inner element in axially fixed position while permitting continued shifting of the outer cylindrical member relatively thereto, the movement of the last-mentioned inner element into its said axially fixed position being transmitted to the other of said inner elements through the intervention of said yieldable means whereby said other inner element is moved into position to present and yieldingly hold its associated friction clutch element in frictional engagement with one of the aforesaid axially fixed friction clutch elements.

12. In a variable speed power transmission mechanism, in combination, a main shaft, a pair of spaced positive clutch elements axially fixed in position and capable of rotation about the axis of said shaft, a positive coupling member rotatable with said shaft and shiftable axially thereof for selective engagement with one or the other of said axially fixed positive clutch elements, said coupling member being in the form of an internally toothed cylindrical member arranged coaxial with said shaft, friction clutch elements respectively associated with said axially fixed positive clutch elements for rotation therewith, axially shiftable friction clutch elements respectively engageable with said axially fixed friction clutch elements, said axially shiftable friction clutch elements having relatively shiftable annular elements disposed internally of said cylindrical coupling member and operative, upon axial shifting of said coupling member in one direction or the other, to effect frictional engagement of one of said axially shiftable friction clutch elements with one of said axially fixed friction clutch elements preliminarily to effecting positive engagement of the coupling member with the positive clutch element immediately associated with the frictionally engaged axially fixed friction clutch element, and yielding means interposed between said annular elements for normally maintaining the same in limited spaced relation and for yieldingly transmitting axial movement from one of said annular elements to the other upon axial shifting of the said coupling member.

13. In a variable speed transmission mechanism as defined in claim 12 wherein said annular elements of the axially shiftable clutch elements are commonly splined to said shaft and coupling member for rotation therewith and axial movement with respect thereto, and wherein said annular elements are respectively provided with radially extending slidable pins, the opposite ends of which are respectively engageable with said shaft and coupling member, said pins being operative, upon shifting of said coupling member in one direction or the other, to initially interlock one or the other of said annular elements to the coupling member for limited axial shifting therewith and thereafter lock said axially shifted annular element in axially fixed position.

14. In a variable speed transmission mechanism as defined in claim 12 wherein said annular elements of the axially shiftable clutch elements are commonly splined to said shaft and coupling member for rotation therewith, the axially shiftable friction clutch elements being respectively formed as integral adjuncts of said annular elements.

15. In a variable speed transmission mechanism as defined in claim 12 wherein said annular elements of the axially shiftable clutch elements are commonly splined to said shaft and coupling member for rotation therewith, the axially shiftable clutch elements aforesaid being selectively shiftable into frictional engagement with one or the other of the axially fixed friction clutch elements upon axial shifting of said annular elements relatively to said coupling member.

16. In a variable speed transmission mechanism as defined in claim 12 wherein said annular elements of the axially shiftable clutch elements are commonly splined to said shaft and coupling member for rotation therewith, said axially shiftable friction clutch elements being respectively disposed at opposite ends of the coupling member and being secured together for conjoint axial movement, said axially shiftable friction clutch elements being respectively in engagement with the opposite ends of said pair of annular elements whereby the same may be shifted in one direction or the other upon axial shifting of said annular elements, and wherein said coupling member is provided with means permitting it to be shifted relatively to said axially shiftable friction clutch elements for positive engagement with one or the other of the axially fixed positive clutch elements.

BENJAMIN B. BACHMAN.
DONALD J. MACKLIN.

REFERENCES CITED

The following references are of record in the file of this patent:

UNITED STATES PATENTS

| Number | Name | Date |
|---|---|---|
| 1,898,949 | Gaylord | Feb. 21, 1933 |
| 2,109,007 | Floss | Feb. 22, 1938 |
| 2,174,148 | Vincent | Sept. 26, 1939 |
| 2,193,039 | Nardone | Mar. 12, 1940 |
| 2,198,273 | Reggio | Apr. 23, 1940 |
| 2,221,893 | White | Nov. 19, 1940 |
| 2,248,134 | Snow | July 8, 1941 |
| 2,259,527 | Manville | Oct. 21, 1941 |
| 2,349,491 | Dugas | May 23, 1944 |
| 2,350,411 | Nabstedt | June 6, 1944 |

FOREIGN PATENTS

| Number | Country | Date |
|---|---|---|
| 680,423 | Germany | Aug. 28, 1939 |